United States Patent [19]

Surjaatmadja et al.

[11] Patent Number: 4,905,281

[45] Date of Patent: Feb. 27, 1990

[54] SECURITY APPARATUS AND METHOD FOR COMPUTERS CONNECTED TO TELEPHONE CIRCUITS

[75] Inventors: Jim B. Surjaatmadja, Duncan; Jack C. Penn, Tulsa, both of Okla.

[73] Assignee: Halliburton Company, Duncan, Okla.

[21] Appl. No.: 190,284

[22] Filed: May 4, 1988

[51] Int. Cl.$^4$ ............................................. H04K 1/00
[52] U.S. Cl. .................................... 380/25; 380/49; 379/95; 340/825.31; 340/825.34
[58] Field of Search ..................... 380/23, 25, 49, 50, 380/59; 364/200, 900; 455/26.1; 379/90, 93, 195–199; 340/825.31, 825.34

[56] References Cited

U.S. PATENT DOCUMENTS

| | | | |
|---|---|---|---|
| 3,852,575 | 12/1974 | Daniels et al. | 379/93 X |
| 3,984,637 | 10/1976 | Caudill et al. | 379/93 |
| 4,350,848 | 9/1982 | Kariya et al. | 379/97 |
| 4,546,213 | 10/1985 | Dick | 379/95 |
| 4,601,011 | 7/1986 | Grynberg | 364/900 |
| 4,604,499 | 8/1986 | Hughes | 379/95 |
| 4,611,098 | 9/1986 | Giorgio et al. | 379/95 X |
| 4,679,226 | 7/1987 | Muehleisen | 379/95 |
| 4,700,378 | 10/1987 | Brown | 379/96 |
| 4,763,351 | 8/1988 | Lipscher et al. | 379/95 |

OTHER PUBLICATIONS

Friend et al., *Understanding Data Communications;* p. 4–1, "Why Data Can't Be Transmitted Directly"; (Sams & Co.; Indianapolis; 1984).

*Primary Examiner*—Stephen C. Buczinski
*Assistant Examiner*—Bernarr Earl Gregory
*Attorney, Agent, or Firm*—E. Harrison Gilbert, III

[57] ABSTRACT

A security apparatus for interfacing a computer system with a telephone circuit includes a modem and a controller interfacing between the telephone circuit and a modem of the computer system. The first-mentioned modem and the controller operate to answer incoming calls in a manner to disguise that the telephone circuit is connected to a computer system, thereby masking or hiding the computer system from unauthorized users such as "hackers."

15 Claims, 3 Drawing Sheets

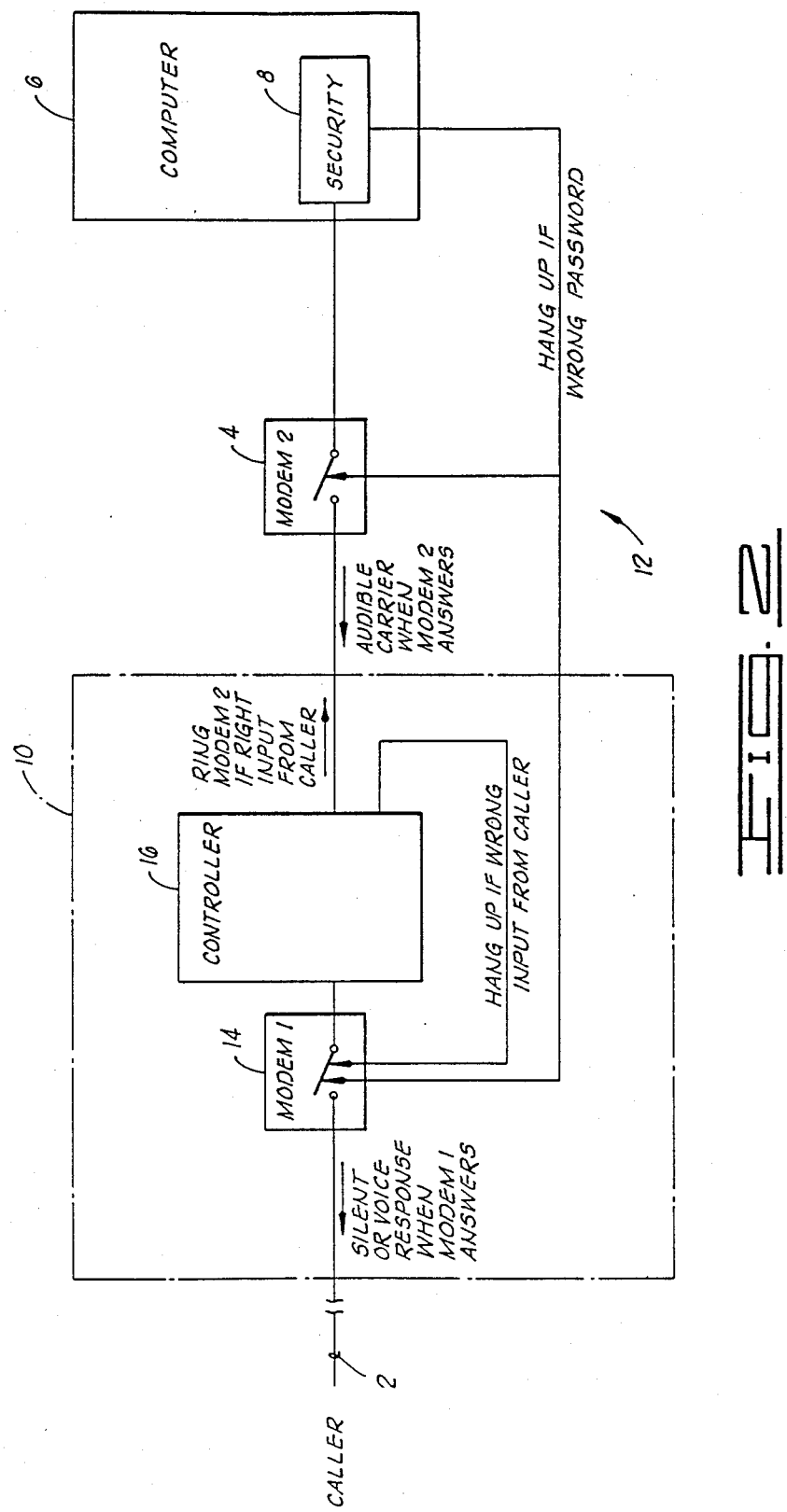

SECURITY APPARATUS AND METHOD FOR COMPUTERS CONNECTED TO TELEPHONE CIRCUITS

BACKGROUND OF THE INVENTION

This invention relates generally to apparatus and methods for securing telephone circuit-connected computers against access by unauthorized calls. More particularly, but not by way of limitation, the invention relates to security apparatus and methods for protectively interfacing a computer system with a telephone circuit, which computer system includes a modem and a computer that normally transmit an audible carrier signal over the telephone circuit as soon as the modem communicates the computer with the telephone circuit in response to an incoming call.

When a computer is connected to a telephone circuit, as is widely done throughout the world today, the computer becomes accessible to unauthorized users, at least some of whom are sometimes referred to as "hackers." The access which these unauthorized users can obtain can have many adverse affects. For example, valuable information stored in the computer can be destroyed, or confidential information stored in the computer can be acquired, or free computing time can be obtained.

Although security measures are sometimes taken to try to avoid unauthorized access, at least one type of these measures can be readily circumvented or solved by a persistent hacker Illustrated in FIG. 1 is a block diagram of what we believe to be a currently typical telephone circuit-connected computer system arrangement of this type which we believe to be readily accessible by an unauthorized user. In this arrangement a telephone circuit 2 is connected to a modem 4 of the computer system. The modem 4 is also connected to a computer 6 which has internal security 8, such as some means for requiring a correct password to be received once the modem 4 has connected the computer to the telephone circuit 2 but before the computer 6 will further communicate with the caller. Prior to any such security being implemented, however, when the correct telephone number of the modem 4 is keyed, the modem 4 communicates the computer 6 with the telephone circuit 2 and an audible carrier signal is returned to the caller.

This typical arrangement and security measure has been found to have a significant shortcoming. An unauthorized user can program a computer (or buy such a program off-the-shelf) to call, in rapid succession, all the 10,000 possible telephone numbers within a given three-digit exchange. Whenever a called number produces an audible carrier signal, the telephone number is logged because this is readily known to be a number at which a computer is connected. The unauthorized user's computer can then redial this number and input different passwords until the correct one is entered and the computer is accessed. Thus, although there has been some measure of security provided within the computer 6, the fact that a particular telephone circuit contains the computer 6 has been readily learned because of the immediate carrier signal transmission which occurs when the modem 4 answers the incoming call.

In view of this shortcoming, there is the need for an apparatus and method which make it more difficult for an unauthorized user to learn which telephone circuits have computers connected to them. That is, there is the need for an apparatus and method to mask or hide that a computer is connected to a particular telephone circuit.

SUMMARY OF THE INVENTION

The present invention overcomes the above-noted and other shortcomings of the prior art by providing a novel and improved apparatus and method for securing telephone circuit-connected computers against access by unauthorized calls.

The present invention initially makes the telephone circuit to which a computer is connected appear to be a noncomputer circuit by not actuating the computer system modem, and thus the audible carrier, until after a predetermined event, such as the passage of a predetermined time or the entry of a preselected entry code, has been detected after an incoming call has been first received. This prevents an unauthorized user from merely dialing the at most 10,000 numbers within a three-digit exchange and receiving an immediate audible carrier response from those circuits to which computers are connected. If transmission and reception of a multiple-digit entry code is first required as the predetermined event, for example, the unauthorized user's computer not only would have to call each of the 10,000 telephone numbers (at a maximum), but also would, at each telephone number, have to go through the permutations of the multiple-digit code before even knowing if the particular telephone circuit had a computer connected to it. The unauthorized user's task is thereby increased from having to make a maximum of 10,000 calls to having to make a maximum of [(10,000) ×(the permutations of the multiple-digit code)] calls.

Thus, the present invention provides a security apparatus for a computer system, particularly a computer system which is adapted for connecting to a telephone circuit and which responds to being placed in communication with the telephone circuit by emitting an audible carrier tone. The security apparatus comprises: answering means, adapted for connecting between the computer system and he telephone circuit, for answering an incoming call over the telephone circuit without emitting an audible carrier tone; and computer system connection control means, connected to the answering means, for detecting the occurrence of a predetermined event after the answering means answers an incoming call and for causing the computer system to communicate with the telephone circuit, including emitting the audible carrier tone, through the answering means in response to detecting the occurrence of the predetermined event.

In a particular embodiment, the present invention provides a system for connecting a computer with an incoming call over a telephone circuit, which system comprises: a first modem, including means for connecting to the telephone circuit; a second modem, including means for connecting to the computer; and controller means, connected to the first modem and the second modem, for controlling the second modem in response to a validated incoming call being received through the first modem so that the computer is communicated through both the second modem and the first modem to the telephone circuit to receive the validated incoming call.

The present invention also provides a method of protecting a computer system connected into a telephone circuit from unauthorized calls, which method comprises the steps of: answering an incoming call before the call is received by the computer system, which incoming call is initiated from a calling end and transmitted over the telephone circuit; detecting whether a predetermined event occurs after the incoming call is answered; and transferring the incoming call to the computer system only if the predetermined event occurs and is detected.

Therefore, from the foregoing, it is a general object of the present invention to provide a novel and improved method and apparatus for securing telephone circuit-connected computers from being accessed by unauthorized calls. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 2 is a block diagram of an apparatus of the present invention interfacing the computer system of FIG. 1 with the telephone circuit.

FIG. 5 is a flow diagram of the operation of a preferred embodiment of the overall combination of the present invention illustrated in FIG. 2.

DETAILED DESCRIPTION OF THE PREFERRED EMBODIMENTS

Figure 1:
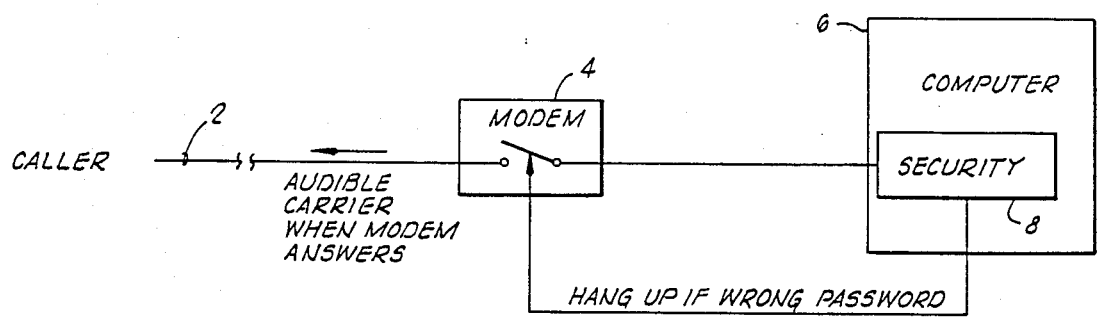
FIG. 1 is a block diagram of a typical prior art arrangement of a modem and a computer connected to a telephone circuit.

The present invention provides a security apparatus 10, shown in FIG. 2, for connecting a computer system 12 with an incoming call over a telephone circuit. As shown in FIG. 2, the apparatus 10 interfaces the previously described prior art computer system, comprising the modem 4 and the computer 6, with the telephone circuit 2. As in its prior art use, when the computer system 12 receives a call, an audible carrier signal is transmitted over the telephone circuit to the caller. Although only one telephone circuit 2 and only one modem 4 (and thus only one apparatus 10) are illustrated for convenience, the computer 6 can be one capable of communicating over several lines through several modems.

For the environment shown in FIG. 2, the present invention provides a modem line answering device which more securely protects the computer 6 against unauthorized access. A primary concept of the present invention is for it to answer an incoming call received over the circuit 2 without sending the carrier signal which is generated when the modem 4 and the computer 6 communicate with the telephone circuit 2. We contemplate that the interfacing security apparatus of the present invention can answer the incoming call with a silent response or with some other noncomputer-indicating response, such as simulated or recorded conversational voices. Thus, this type of interfacing does not immediately indicate the presence of a computer simply in response to the telephone number of the circuit being keyed. It is contemplated that even announcements to the general public regarding the use of the present invention will not reduce its effectiveness assuming, of course, that a telephone number with which it is used is not also made public.

The security apparatus 10 of the present invention broadly comprises two components. One is an answering means for answering an incoming call over the telephone circuit 2 without emitting an audible carrier tone. The answering means is adapted for connecting between the computer system 12 and the telephone circuit 2. The other component is a computer system connection control means, which is connected to the answering means, for detecting the occurrence of a predetermined event after the answering means answers an incoming call and for causing the computer system 12 to communicate with the telephone circuit 2, including emitting the audible carrier tone, through the answering means in response to detecting the occurrence of the predetermined event. These two components are defined in the preferred embodiment illustrated in FIG. 2 by a modem 14 and a controller means 16, connected to the modem 14 and the modem 4, for controlling the modem 4 in response to a validated incoming call being received through the modem 14 so that the computer 6 is communicated through both modems 4, 14 to the telephone circuit 2 to receive the validated incoming call.

The modem 14 is a conventional modem, such as of the same type as the modem 4. The modem 14 includes means for connecting it to the telephone circuit 2 in a manner as known to the art. Similarly, the modem 4 has means for connecting it to the computer 6 in a manner as known to the art. Each of the modems 4, 14 also includes means for connecting it to the controller means 16 in a manner as would be readily known to those skilled in the art for a particular type of controller means 16 implemented in accordance with the present invention.

The controller means 16 of the preferred embodiment broadly includes: means for determining if an incoming call received over the telephone circuit 2 through the modem 14 is a call authorized to communicate with the computer 6; means for activating the modem 4 in response to the means for determining determining that the incoming call is authorized to communicate with the computer 6 (thereby validating the incoming call); and means for deactivating the modem 14 in response to the means for determining determining that the incoming call is not authorized to communicate with the computer 6. Preferred embodiments of these are illustrated in FIGS. 3 and 4.

Figure 3:
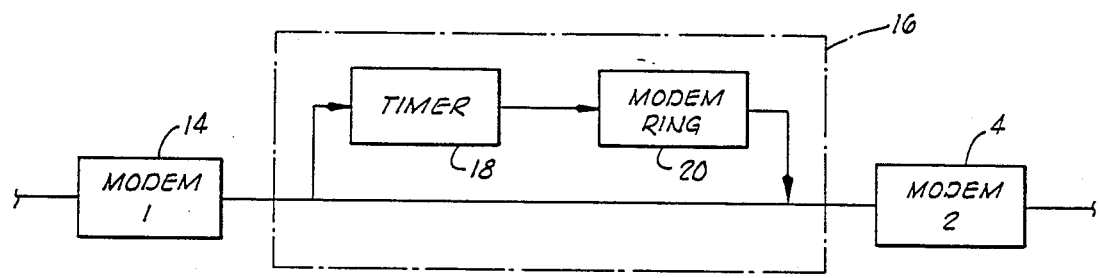
FIG. 3 is a block diagram illustrating a preferred embodiment of at least a portion of the controller of the present invention shown in FIG. 2.
Figure 4:
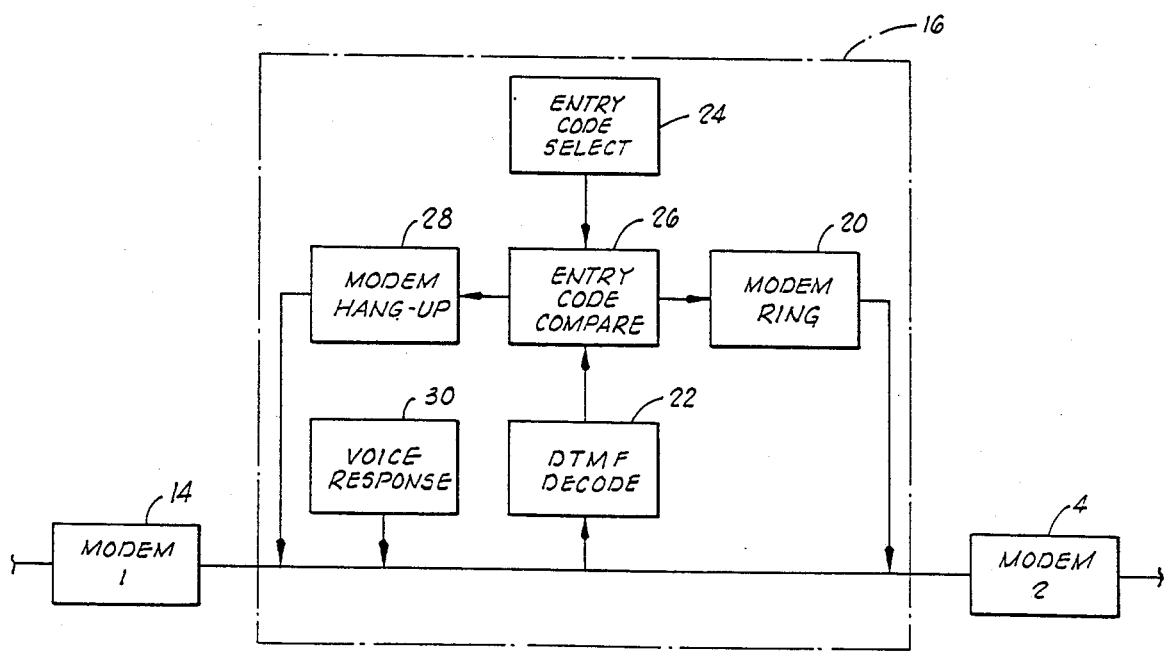
FIG. 4 is a block diagram illustrating another preferred embodiment of at least a portion of the controller of the present invention shown in FIG. 2.
Figure 9:
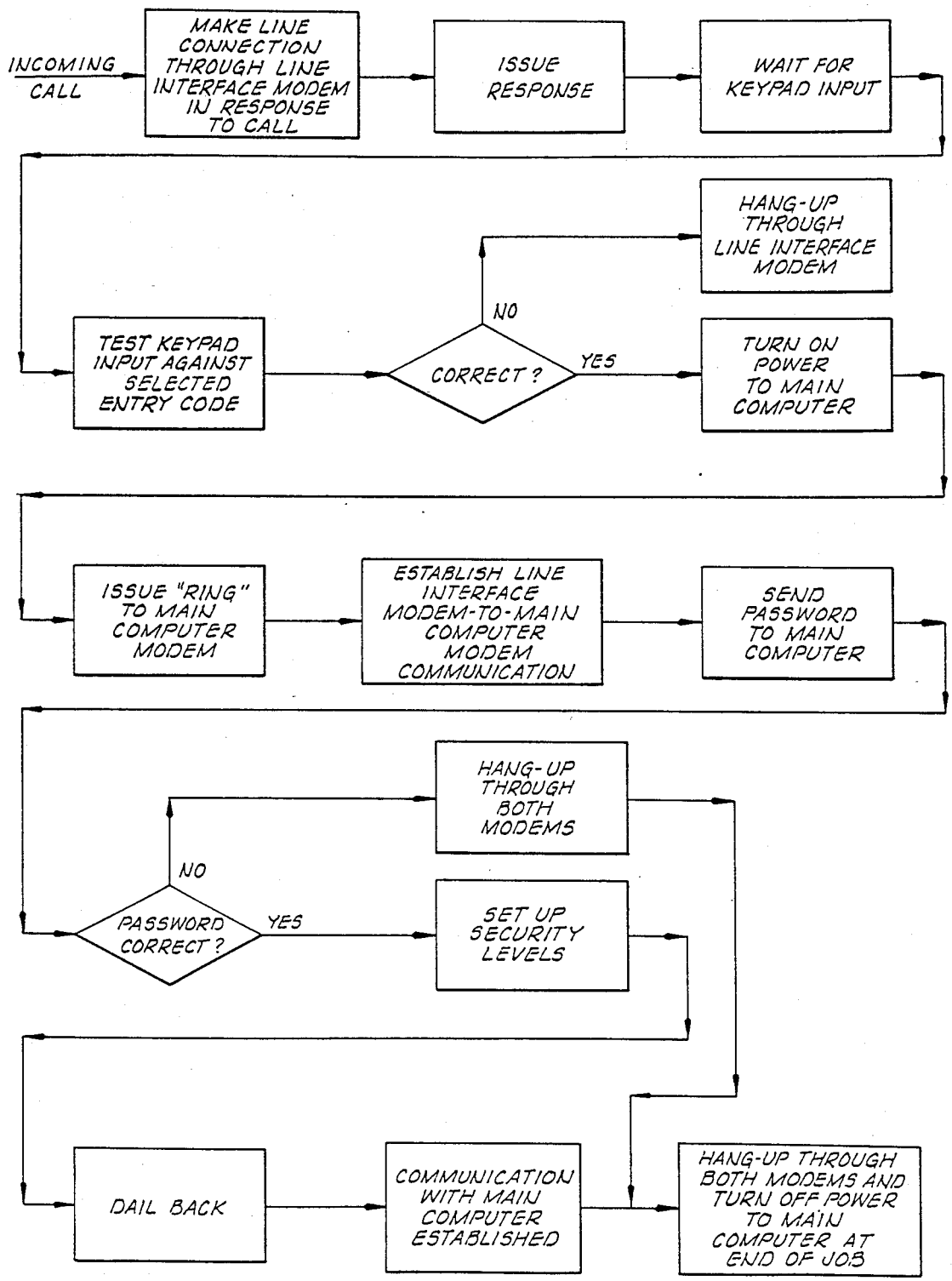

In FIG. 3, the means for determining if an incoming call is an authorized call includes timer means 18 for detecting the expiration of a predetermined timing period commenced in response to answering through the modem 14 the incoming call placed over the telephone circuit 2. The timer means 18 functions so that, if the caller has not hung up from the calling end of the telephone circuit 2, the timer means 18 generates a signal indicating that the timing period has expired. It is contemplated that this can be readily implemented by an integrated circuit timer or a programmed microprocessor, either of which would commence timing when the modem 14 answers a call and which would reset itself upon the caller hanging up or the time period, set by resistor-capacitor components connected to the timer chip or by programming of the microprocessor, expiring.

This signal output from the timer means 18 is provided to a modem ring circuit 20, which is the FIG. 3 embodiment of the means for activating the modem 4 in response to the determination that the incoming telephone call is authorized (here, validation occurs simply by the caller not hanging up before the timer means 18 times out). The modem ring circuit 20 has a design believed to be known or readily implemented by those in the art, which design effectively generates an internal call (i.e., it effectively dials or keys the number of the modem 4) and transmits it to the modem 4 of the computer system 12 so that upon answering this internal call the computer system 12 is in communication with the telephone circuit 2 through the modem 14. That is, the modem ring circuit 20, in response to a signal from the timer means 18, provides a suitable signal to the modem 4 which the modem 4 recognizes as an incoming call to it, thereby causing the modem 4 to connect the computer 6 through it to the remainder of the circuit to which the modem 4 is connected. It is only upon this connection of the computer system 12 that the conventional audible carrier signal is transmitted through the circuit to the calling end of the circuit 2. Thus, the controller means 16 also includes means for transmitting a carrier signal from the modem 4 through the modem 14 in response to the modem 4 being activated.

In FIG. 3 there is no means for deactivating the modem 14 associated with the operation of the timer means 18 and the modem ring circuit 20 because the modem 14 will be deactivated simply upon the caller hanging up before the period of the timer means 18 expires or, if the caller has not hung up by that time, the modem 14 will be deactivated by the computer 6 when communications through the modems 4, 14 are completed.

Referring to the FIG. 4 embodiment of the controller means 16, the means thereof for determining if the incoming telephone call is an authorized call includes three components. One is a signal decode means 22 for decoding analog signals, transmitted in the incoming call, into corresponding digital signals. This is shown implemented as a dual-tone, multiple-frequency (DTMF) decoder of a type as known to the art for decoding DTMF signals entered through the keypad or otherwise generated by the caller making the incoming call. The decoder provides digital signals, such as in binary or binary-coded-decimal format, at its output. A second component is an entry code select means 24 for selectably defining an entry code. It is contemplated that a preferred embodiment of the entry code select means 24 would include buttons, keypad, thumbwheel switches or the like manually actuated by one who sets up the apparatus 10. When actuated or set in a preselected manner, digital signals are generated to define a preselected entry code. A third component is an entry code compare means 26, responsive to the signal decode means 22 and the entry code select means 24, for determining whether the corresponding digital signals provided by the means 22 designate the entry code specified by the means 24. That is, the code represented by the digital signal output from the means 22 is compared against the preselected entry code represented by the digital signals entered through the means 24. It is contemplated that a preferred embodiment of the entry code compare means 26 would be a suitable comparator of a type as known to the art, one specific example of which would be a microcomputer programmed in a known manner to compare the digital outputs provided by the means 22, 24.

In the FIG. 4 embodiment, the means for activating the modem 4 in response to a determination that the incoming call is authorized is implemented by the same modem ring circuit 20 as described hereinabove with reference to FIG. 3. In response to the entry code compare means 26 determining that the code sent by the caller matches the selected entry code, the modem ring circuit 20 activates the modem 4 in a known manner. That is, if a proper code has been sent by the caller, the means 26 generates a signal or causes a function to be performed to trigger the modem ring circuit 20.

If there is no code sent by the caller or if the code is incorrect, the entry code compare means 26 causes a modem hang-up circuit 28 to hang up the modem 14 on the caller. More broadly, the circuit 28 provides means, responsive to the entry code compare means 26 determining that the corresponding digital signals do not designate the entry code, for disconnecting the modem 14 from the incoming call. The circuit 28 is contemplated to be of a type known to or readily implemented by the art.

Thus, this embodiment shown in FIG. 4 requires a suitable entry code input from the incoming call. This will most likely be a DTMF input as generated by conventional telephonic equipment. The code can be one or more numbers in length which must be received in the correct sequence. Any mistakes in the code will cause the apparatus 10 to hang up on the incoming call. If a correct code is received, the computer system 12 will be placed on line in communication with the telephone circuit 2 through the modem 14.

It is contemplated that the entry code can also be divided into two or more sections for even more security. For example, a first section would determine the validity of the call and establish the modem-to-modem communication when a correct code is received, and the second section would be transmitted to the computer 6 as a password for access security and access security levels within the computer 6.

Also shown in FIG. 4 is another component which is included within the illustrated preferred embodiment of the controller means 16. This component is a voice response means 30 for generating and transmitting a voice response through the modem 14 in response to the modem 14 receiving the incoming call. The voice response means 30 can be a suitable device known to the art for synthesizing a voice or it can be a recording of an actual voice much as is used in a conventional voice telephone answering machine.

Each of the individual components of the modem 14 and the controller means 16 described hereinabove are contemplated to be implemented with conventional, known types of equipment connected and programmed or otherwise implemented in a manner readily known in the art given the disclosure of the invention herein. It is specifically contemplated that much of what has been described to be comprised within the controller means can be implemented through a suitably and readily programmed microcomputer operating with the necessary peripheral devices to achieve the described interfacing and signalling requirements described hereinabove and inherent in communicating over a telephone circuit. Of course, it is also contemplated that discrete components can be used to implement the present invention.

The present invention also provides a method of protecting a computer system, such as the computer system 12, connected into a telephone circuit from unauthorized calls. The method includes answering an incoming call over the telephone circuit before the call is received by the computer system, which incoming call is initiated from a calling end and transmitted over the telephone circuit; detecting whether a predetermined event occurs after the incoming call is answered; and transferring the incoming call to the computer system only if the predetermined event occurs and is detected.

For the environment illustrated in the drawings, the step of answering includes actuating, in response to the incoming call, the circuit of the modem 14 connected to the telephone circuit 2. This is to be performed without sending a computer system carrier signal back to the calling end, thereby initially masking or hiding that a computer is connected to the called circuit.

Within the illustrated environment, the step of detecting whether a predetermined event occurs after the incoming call is answered includes either the timer or entry code function of the equipment described hereinabove with reference to FIGS. 3 and 4. Regarding the timing function, the step of detecting includes determining if a predetermined time period after the incoming call is answered expires before the incoming call is terminated from the calling end. With respect to the FIG. 4 embodiment, the step of detecting includes determining if a preselected entry code is transmitted in the incoming call when the incoming call is being received through the modem 14. In the preferred embodiment this includes determining if a plurality of dual-tone multiple-frequency signals are transmitted from the calling end in a preselected sequence after the incoming call is answered.

If the timing period expires or if the entry code is properly entered or if an otherwise predetermined event has occurred, the step of transferring is then implemented to actuate the modem 4 so that the computer system 12 is placed in communication with the telephone circuit 2 through the modem 14.

In the illustrated environment, the method of the present invention also comprises the step of transmitting a voice response over the telephone circuit 2 when the incoming call is answered. Such a voice response is believed particularly useful in disguising that the telephone circuit 2 is connected to the computer system 12 in that a voice response would make the telephone circuit 2 initially appear to be a conventional voice, rather than data communication, telephone circuit.

A more specific methodology of the present invention will be described with reference to FIG. 5 as used within the preferred embodiment apparatus illustrated in FIGS. 2 and 4. It is contemplated that this methodology depicted in FIG. 5 can be readily implemented through a microprocessor or otherwise as would be readily known to those skilled in the art.

Initially, an incoming call is received at the modem 14 and when this incoming call has the appropriate telephone number, the modem 14 makes a line connection, which can be delayed until a preselected number of "rings" has occurred. A voice response, either synthesized or prerecorded, is sent back through the modem 14 to the caller (examples of responses and actions not limited to what is shown in FIG. 4 include: "Hi, this is XXX residence . . . " followed by time out for DTMF entry; "I'm sorry, you have reached the wrong number" followed by a hang-up; "Hi, this is YYY. I'm not home at this time. Please leave your number and message after the beep." followed by a time out; also the silent response can be given such as if the FIG. 3 preferred embodiment were used). Using the implementation shown in FIG. 4, the apparatus 10 then waits for a keypad or other DTMF-generating input. This input is tested against a preselected entry code entered through the mechanism of the entry code select means 24. If it is not correct, the modem hang-up circuit 28 causes the modem 14 to hang up or disconnect from the incoming call. If the entry code is correct, then an optional feature of turning on the power to the main computer 6 and any peripherals to start an automatic boot program could be implemented. The modem ring circuit 20 rings the modem 4 and communication is established between the modem 14 interfacing the telephone line and the modem 4 interfacing the main computer 6. At this time, the conventional carrier signal is generated and transmitted. Thereafter, the caller would have to send a password (if needed) to the main computer 6 to overcome the conventional internal security means 8 of the computer 6. If the password is incorrect, the computer 6 causes both modems 4, 14 to hang up and, if implemented, the power to the main computer 6 would be turned off. If the password is correct, additional conventional security levels and dial-back features can be implemented as known to the art. Once these additional security means, if any, are passed, communication with the main computer 6 is established. Upon completion of the communication, the computer 6 causes both modems 4, 14 to hang up.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A system for connecting a computer with an incoming call over a telephone circuit, said system comprising:

a first modem, including means for connecting to the telephone circuit;

a second modem, including means for connecting to the computer; and controller means, connected to said first modem and said second modem, for controlling said second modem in response to a validated incoming call being received through said first modem so that said computer is communicated through both said second modem and said first modem to said telephone circuit to receive the validated incoming call.

2. A system as defined in claim 1, wherein said controller means includes:

means for determining if an incoming call received over the telephone circuit through said first modem is a call authorized to communicate with the computer;

means for activating said second modem in response to said means for determining determining that the incoming call is authorized to communicate with the computer; and means for deactivating said first modem in response to said means for determining determining that the incoming call is not authorized to communicate with the computer.

3. A system as defined in claim 2, wherein said means for activating said second modem includes means for generating and transmitting a call signal to said second modem.

4. A system as defined in claim 3, wherein said controller means further includes:
   means for generating and transmitting a voice response through said first modem in response to said first modem receiving any incoming call; and
   means for transmitting a carrier signal from said second modem through said first modem in response to said second modem receiving said call signal.

5. A system as defined in claim 4, wherein said means for determining includes:
   signal decode means for decoding analog signals, transmitted in the incoming call, into corresponding digital signals;
   entry code select means for selectably defining an entry code; and
   entry code compare means, responsive to said signal decode means and said entry code select means, for determining whether said corresponding digital signals designate said entry code.

6. A system as defined in claim 1, wherein said controller means includes:
   signal decode means for decoding analog signals, transmitted in an incoming call, into corresponding digital signals;
   entry code select means for selectably defining an entry code; and
   entry code compare means, responsive to said signal decode means and said entry code select means, for determining whether said corresponding digital signals designate said entry code.

7. A system as defined in claim 6, wherein said controller means further includes:
   means for generating and transmitting a voice response through said first modem in response to said first modem receiving any incoming call; and
   means for transmitting a carrier signal from said second modem through said first modem in response to said entry code compare means determining that said corresponding digital signals designate said entry code.

8. A system as defined in claim 1, wherein said controller means includes:
   means for generating and transmitting a voice response through said first modem in response to said first modem receiving any incoming call; and
   means for transmitting a carrier signal from said second modem through said first modem in response to a validated incoming call being received through said first modem.

9. A system as defined in claim 1, wherein said controller means includes:
   timer means, connected to said first modem, for detecting the expiration of a predetermined timing period commenced in response to an incoming call received through said first modem over the telephone circuit; and
   means, connected to said timer means, for generating an internal call and for transmitting said internal call to said second modem in response to expiration of the predetermined timing period so that upon answering said internal call the computer is in communication with the telephone circuit through both said second modem and said first modem.

10. A method of protecting a computer system connected into a telephone circuit from unauthorized calls, said method comprising the steps of:
    answering through a first modem an incoming call before the call is received by the computer system, which incoming call is initiated from a calling end and transmitted over the telephone circuit to the first modem;
    detecting whether a predetermined event occurs after the incoming call is answered by the first modem; and
    transferring through a second modem the incoming call to the computer system only if the predetermined event occurs and is detected so that communication between the computer system and the telephone circuit occurs through both of the first and second modems.

11. A method as defined in claim 10, further comprising the step of transmitting a voice response over the telephone circuit when the incoming call is answered by the first modem.

12. A method as defined in claim 10, wherein said step of detecting includes determining if a predetermined time period after the incoming call is answered by the first modem expires before the incoming call is terminated from the calling end so that the predetermined event upon which the incoming call is transferred is defined as the expiration of the time period without the incoming call being terminated.

13. A method as defined in claim 10, wherein said step of detecting includes determining if a plurality of dual-tone multiple-frequency signals are transmitted from the calling end in a preselected sequence after the incoming call is answered.

14. A system for connecting a computer with an incoming call over a telephone circuit, said system comprising:
    a first modem connected to said telephone circuit for answering said incoming call without emitting an audible carrier tone;
    a second modem connected to said computer;
    controller means, connected to said first modem and said second modem, for controlling said second modem in response to a valid incoming call being received through said first modem so that said computer is communicated through both said second modem and said first modem to said telephone circuit to receive said valid incoming call, said controller means comprising:
    timer means for detecting the expiration of a predetermined timing period commenced in response to said first modem answering said incoming call, said timer means generating a time signal indicating that said timing period has expired, and
    a modem ring circuit, responsive to said time signal, which generates an internal call to said second modem upon receiving said time signal so that, upon answering said internal call, said second modem and said computer are in communication with said telephone circuit through said first modem; and
    means, connected between said computer and said first and second modems, for disconnecting said modems from said valid incoming call when said first modem, said second modem, and said computer are all in communication with said telephone circuit and an incorrect password is transmitted in said incoming call.

15. A system for connecting a computer with an incoming call over a telephone circuit, said system comprising:
- a first modem connected to said telephone circuit for answering said incoming call without emitting an audible carrier tone;
- a second modem connected to said computer;
- controller means, connected to said first modem and said second modem, for controlling said second modem in response to a valid incoming call being received through said first modem so that said computer is communicated through both said second modem and said first modem to said telephone circuit to receive said valid incoming calls, said controller means comprising:
  - a dual tone multiple frequency decoder for decoding analog signals, transmitted in said incoming call, into corresponding digital signals,
  - entry code select means for selectably defining an entry code,
  - entry code compare means, responsive to said signal decoder and said entry code select means, for determining whether said digital signals designate said entry code,
  - a modem ring circuit, responsive to said entry code compare means determining that said digital signals designate said entry code, for generating an internal call and for transmitting said internal call to said second modem, so that upon answering said internal call, said second modem and said computer are in communication with said telephone circuit through said first modem,
  - a modem hang-up circuit, responsive to said entry code compare means determining that said digital signals do not designate said entry code, for disconnecting said first modem from said incoming call, and
  - means for generating and transmitting a voice response through said first modem upon said first modem receiving said incoming call and before said second modem and said computer are in communication with said telephone circuit through said first modem; and
- means, connected between said computer and said first and second modems, for disconnecting said modems from said incoming call when said first modem, said second modem, and said computer are all in communication with said telephone circuit and an incorrect password is transmitted in said incoming call.

* * * * *